May 29, 1923.
E. J. HUDSON
MOTOR FOR WINDSHIELD WIPERS
Filed May 11, 1922   2 Sheets-Sheet 1
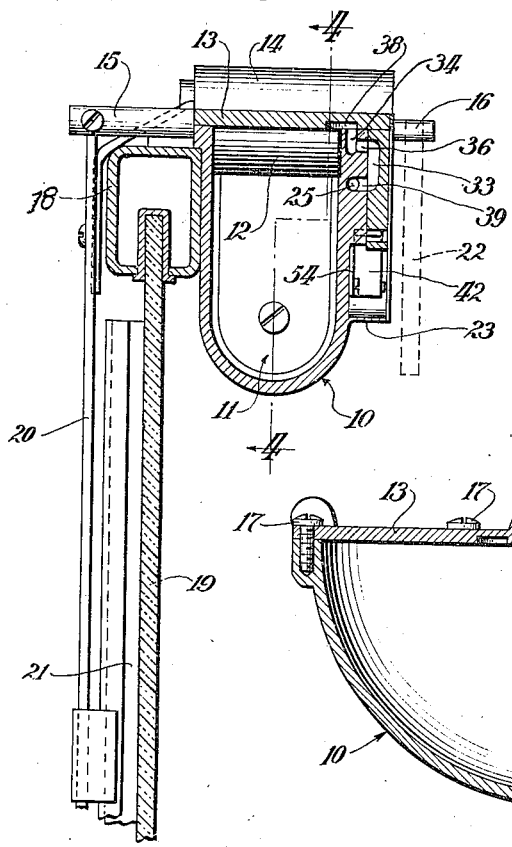
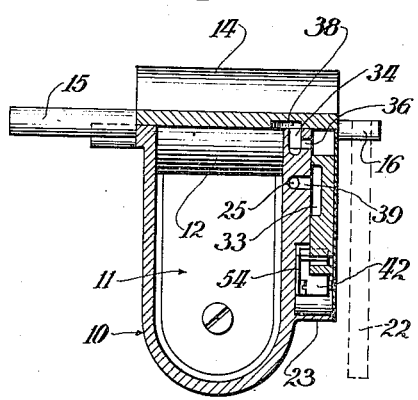
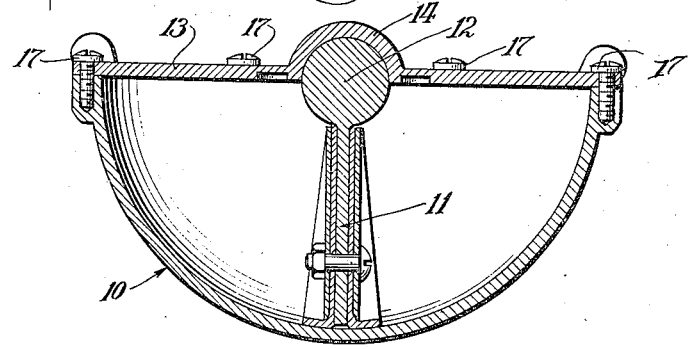
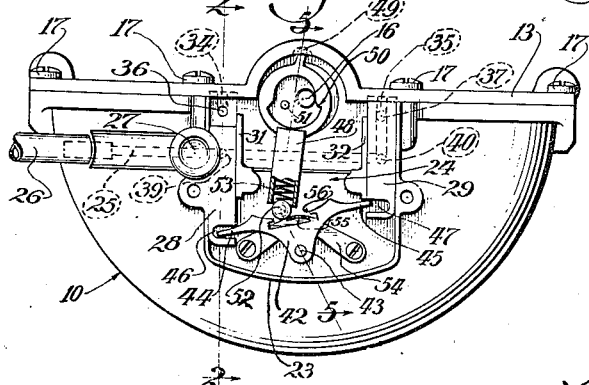
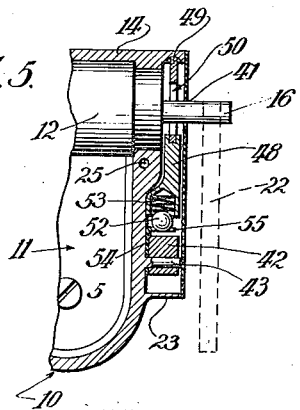
Inventor:
Edward J. Hudson May 29, 1923.

E. J. HUDSON

MOTOR FOR WINDSHIELD WIPERS

Filed May 11, 1922

Inventor:
Edward J. Hudson
By Dunning & Dunning
Att'ys.

Patented May 29, 1923.

1,457,031

UNITED STATES PATENT OFFICE.

EDWARD J. HUDSON, OF GLENCOE, ILLINOIS.

MOTOR FOR WINDSHIELD WIPERS.

Application filed May 11, 1922. Serial No. 560,005.

*To all whom it may concern:*

Be it known that I, EDWARD J. HUDSON, a citizen of the United States, residing at Glencoe, in the county of Cook and State of Illinois, have invented certain new and useful Improvements in Motors for Windshield Wipers, of which the following is a specification.

This invention has to do with certain improvements in wind shield wipers. The invention has reference to improvements in wind shield wipers adapted to be operated by air suction or pressure as the case may be. Ordinarily, wind shield wipers embodying the features of the present invention will be operated by suction created by the operation of the internal combustion engine of the motor vehicle on which the wind shield is used, and for this reason I will herein refer to the device as being operated by suction. It will be understood, however that it might be operated to equal advantage in some cases by the use of pressure.

One of the objects of the invention is to provide an improved form and arrangement of the valve mechanism by means of which the suction is applied alternately to the opposite sides of the piston or plunger so as to cause the same to reciprocate in the proper manner. In this connection, it may be stated that the suction created by the operation of an internal combustion engine fluctuates within very wide limits according to the speed of engine operation and according to the amount of throttle opening. Furthermore, when the engine throttle is suddenly opened, the suction is greatly reduced, whereas upon a sudden closing of the engine throttle a reverse condition is brought about. The wind shield wiper must therefore operate under the peculiar conditions resulting from the nature of the suction producing device with which it is associated. The valve mechanism by means of which the suction is applied to move the mechanism alternately in one direction and then in the other should be so constituted as to ensure a full travel of the wiper in each direction before the reversal of the wiper movement takes place, in order to ensure a complete and satisfactory cleaning operation. The valve mechanism should also be so arranged that this result will be brought about notwithstanding the fact that sudden and large variations of suction may take place during the movement of the wiper in either direction.

The main object of the present invention is to provide a valve mechanism which will satisfactorily function in the manner above explained and under the conditions of operation existing in devices of this class and as hereinbefore explained.

Another object of the invention relates to the provision of a wind shield wiping device in which a valve mechanism responding to the above requirements is associated with a very simple form of piston and cylinder arrangement, so that the entire complete device may be very simple in construction and definite in its operation.

Other objects and uses of the invention will appear from a detailed description of the same, which consists in the features of construction and combination of parts hereinafter described and claimed.

In the drawings:

Figure 1 shows a side elevation of a wind shield wiper embodying the features of the present invention, the front plate of the valve mechanism being removed in order to show the construction of the valve mechanism itself;

Fig. 2 shows a section taken on the line 2—2 of Fig. 1, looking in the direction of the arrows, the squeegee being removed;

Fig. 3 shows a view corresponding to Fig. 2, with the exception that the valve stands in the reversed position, and the squeegee is mounted on the rock shaft, the wind shield wiper being shown in position on the frame of a wind shield;

Fig. 4 shows a section taken on the line 4—4 of Fig. 3, looking in the direction of the arrows;

Fig. 5 shows a section taken on the line 5—5 of Fig. 1, looking in the direction of the arrows, but on enlarged scale;

Figure 6:
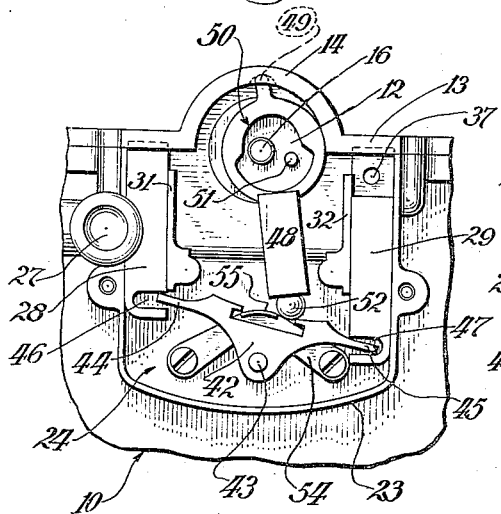
Fig. 6 shows an enlarged face view of the valve mechanism in what may be designated the initial position, corresponding to the commencement of a stroke of the piston.
Figure 7:
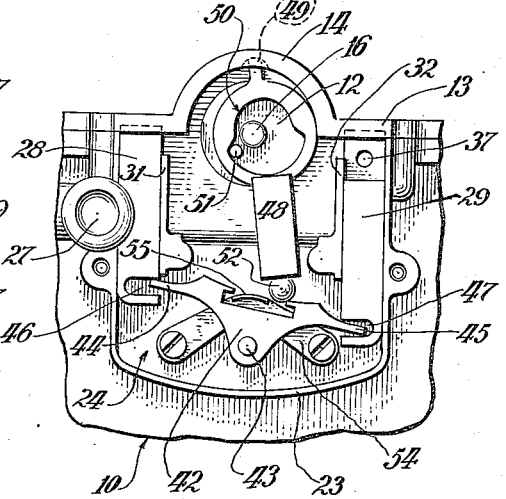
Fig. 7 shows a view corresponding to Fig. 6, with the exception that the piston and rock shaft have advanced to the position where the toggle lever is picked up.
Figure 8:
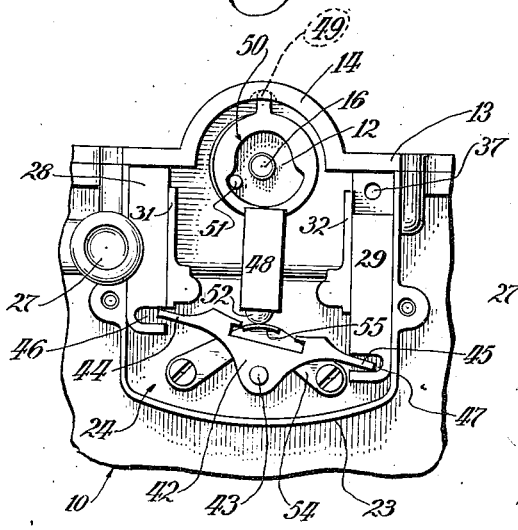
Figure 9:
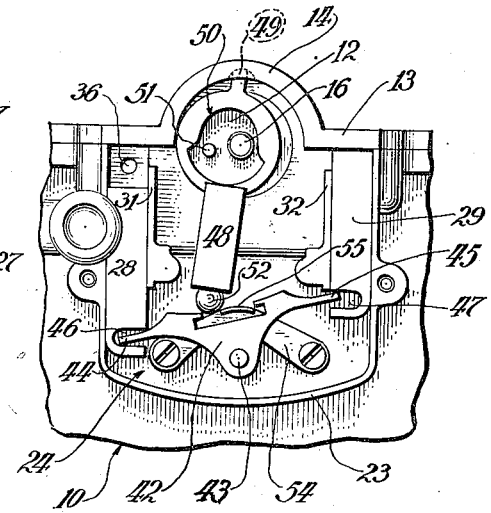

Fig. 8 shows a view corresponding to Figs. 6 and 7, with the exception that the piston and rock shaft have advanced a further distance, carrying with them the toggle lever to a point where it is about ready to snap over dead center to reverse the valve; and Fig. 9 shows a view corresponding to Figs. 6, 7 and 8, with the exception that the toggle lever has snapped over dead center and has reversed the mechanism so as to apply the suction to the other side of the piston mechanism.

In the several figures I have shown the features of the present invention as being applied to that type of wind shield wiper which includes a semi-circular cylinder or piston chamber 10 within which there is swingingly mounted the piston 11 carried by the rock shaft 12. I have illustrated the present valve mechanism as incorporated within a device of this general type largely for purposes of convenience in illustration, but not as a matter of limitation, except as I may limit my invention in the claims.

The particular construction illustrated in the drawings also includes a removable cover plate 13 having a central upstanding part 14 which overlies the rock shaft 12. The end portions 15 and 16 of the rock shaft are of reduced size as compared with its central portion and pass through suitable journals in the casing. Screws 17 serve as a convenient means for holding the cover plate in place, and a gasket or other air seal may be used between the casing and cover plate if necessary.

The casing is adapted for attachment to the frame 18 of a wind shield panel 19 as shown in Fig. 3. A rock arm 20 may be connected to the projecting portion 15 of the rock shaft, said rock arm carrying a squeegee 21 which works against the surface of the wind shield.

If desired, a hand lever 22 may be mounted on the inner end 16 of the rock shaft so as to permit the operator of the vehicle to rock the squeegee by hand.

The valve mechanism to which the present invention particularly relates is conveniently mounted within a chamber established by the wall 23 projecting from the back side of the casing 10. This wall 23, together with the cover plate 13 establishes a chamber 24 within which the valve mechanism is located. A suction passage 25 leads across the width of the chamber 24 with which, however, it does not communicate directly, and a flexible hose 26 may be connected with the passage 25, said hose leading to the intake manifold of the engine so as to apply the suction thereof to the passage 25. A valve 27 is provided to cut off the passage 25 at a point in advance of the valve mechanism when the operation is to cease.

A pair of slide valves 28 and 29 are mounted in vertical fashion at the two sides of the chamber 24. These slide valves are adapted to reciprocate up and down being guided in their movements by the partitions 31 and 32. Each slide valve had on its under face which contacts against the chamber 10 a cut away portion or groove 33, as clearly shown in Figs. 2 and 3. In the upper portion of the casing 10 and at opposite sides of the rock shaft 12, are located the upwardly facing ports 34 and 35. The lower ends of these ports communicate with the backwardly reaching ports 36 and 37 respectively, which terminate adjacent to the slide valves. The cover plate 13 is provided with recesses 38 in its bottom face which communicate with the ports 34 and 35 respectively, said recesses 38 reaching over into communication with the two ends of the cylinder chamber. Consequently, communication is established between the ports 36 and 37 and the respective ends of the chamber.

Other ports 39 and 40 reach backward from the passage 25 to points adjacent to the slide valve 28 and 29 respectively. The cut away portions 33 of the slide valves are of proper size to establish communication between the port 39 or the port 40, and the port 36 or the port 37 as the case may be, when the slide valves are respectively raised into the positions shown in Figs. 1 and 3. On the other hand, when the slide valves are lowered into the position of Fig. 2 the ports 39 or 40, as the case may be, are covered, the corresponding ports 36 or 37 being uncovered to admit air into the corresponding ends of the cylinder. This air may flow in at the point 41 around the rear extension 16 of the rock shaft, or at other points where leakage occurs.

The slide valves 28 and 29 are to be raised and lowered simultaneously and in opposition, and these movements should only take place when the piston is at or near the extreme end of its movement. A balance lever 42 is pivoted to the back face of the casing at the point 43. The ends 44 and 45 of this balance lever engage slots 46 and 47 of the slide valves 28 and 29 respectively. The rock of the balance lever in one direction or the other will bring about the contrary movements of the slide valves.

A toggle pin 48 has its upper end pivoted with respect to the cover plate 13 at the point 49. The upper portion of this toggle lever is cut out as shown at 50 and straddles the projecting portion of the shaft 16. On the exposed end of the rock shaft 12 is a pin 51 which works within this cut away portion 50 and is adapted to strike the same alternately at opposite sides so as to rock the pin 48 first in one direction and then in the other. This rocking movement of the pin 48 is only brought about after the pin 51 has traveled almost the entire distance as dictated by the piston travel. The pin 48 remains stationary during almost the entire amount of the piston travel.

The pin 48 has its lower end hollowed out and receives a ball 52 which is forced downwardly by the pressure of a spring 53. A bracket plate 54 is secured to the back face of the casing, the upper central portion of said bracket plate being turned rearwardly at right angles in the form of a central support 55, as shown in Fig. 1. This central support 55 extends through a cutaway portion 56 of the balance lever, and the ball 52 travels during the major portion of its movement on the plate 55 and out of contact from the balance lever 42. The ball only comes into contact with one end or the other of the balance lever after the ball has passed dead center on the plate 55, and when the ball passes this dead center the pressure of the spring 53 causes the pin 48 to snap over suddenly and thus effect an almost instantaneous reversal of the balance lever 42 when the ball 52 strikes said balance lever.

These movements are very clearly set forth in the serial shown in Figs. 6, 7, 8 and 9. In the position of Fig. 6, the pin 48 is at the right hand position, and the control pin 51 is also at the right hand position, this being also the position of the piston within the casing. With the valves in the position shown in Fig. 6, the suction will tend to draw the piston towards the left in said figure, thus carrying with it the pin 51. When said pin reaches the position of Fig. 7, it picks up the pin 48 and carries said pin to the position shown in Fig. 8. At the position shown in Fig. 8, the pin 48 is just passing dead center and immediately snaps to the left under the pressure of the spring 53 so as to reverse the valve mechanism into the position of Fig. 9. This reversal takes place so quickly that the pin 51 and the piston are practically in the same position in Fig 9 as in Fig. 8. The suction is thus reversed almost instantly, and the piston commences to travel in the reversed direction. It is thus clear that the valves, together with the balance lever always remain at rest in either one position or the other during substantially the entire travel of the toggle pin and piston, the toggle pin being carried during almost its entire travel by the stationary abutment 55.

While I have herein shown and described only a single embodiment of the features of my present invention, still I do not limit myself to the same except as I may do so in the claims.

I claim:

1. In a device of the class described the combination with an arcuate cylinder, a rock shaft extending across the upper portion thereof, and a piston carried by said rock shaft and working within the cylinder, and there being a suction passage adjacent to said cylinder, of valve mechanism for controlling communication between said suction passage and each end of the cylinder alternately, including a port reaching through the wall of the cylinder to each end thereof, a vertically movable slide valve slidably mounted on the wall of the cylinder adjacent to each said port, the sliding face of each said valve being cut away to provide a recess therein, a balance lever pivotally mounted between the slide valves, an operative connection from each end of the balance lever to the adjacent slide valve, a toggle pin having its upper end pivotally mounted with respect to the cylinder and provided with an opening, an eccentric pin on the rock shaft working in said opening and adapted to engage the sides thereof to swing the toggle pin back and forth, there being a stationary abutment adjacent to the lower end of the toggle pin and immediately above the central portion of the balance lever, and a spring pressed ball in the lower end of the toggle pin adapted to travel over said abutment and into contact with the balance lever alternately at opposite sides of its pivotal point, substantially as described.

2. In a device of the class described the combination with a cylinder, a piston working therein, and a rock shaft in conjunction with said piston, and there being a suction passage adjacent to said cylinder, of valve mechanism for controlling communication between said suction passage and each end of the cylinder alternately, including a port reaching through the wall of the cylinder at each end thereof, a vertically movable slide valve slidably mounted on the wall of the cylinder adjacent to each said port, the sliding face of each said valve being cut away to provide a recess therein, a balance lever pivotally mounted between the slide valves, an operative connection from each end of the balance lever to the adjacent slide valve, a toggle pin having its upper end pivotally mounted with respect to the cylinder and provided with an opening, an eccentric pin on the rock shaft working in said opening and adapted to engage the sides thereof to swing the toggle pin back and forth, there being a stationary abutment adjacent to the lower end of the toggle pin and immediately above the central portion of the balance lever, and a spring pressed ball in the lower end of the toggle pin adapted to travel over said abutment and into contact with the balance lever alternately at opposite sides of its pivotal point, substantially as described.

3. In a device of the class described the combination with a cylinder, a piston working therein, and a rock shaft in conjunction with said piston, and there being a suction passage adjacent to said cylinder, of valve mechanism for controlling communication between said suction passage and each end of the cylinder alternately, including a port reaching through the wall of the cylinder at each end thereof, a slide valve slidably mounted on the wall of the cylinder adjacent to each said port, the sliding face of each said valve being cut away to provide a recess therein, a balance lever pivotally mounted between the slide valves, an operative connection from each end of the balance lever to the adjacent slide valve, a toggle pin having its upper end pivotally mounted with respect to the cylinder and provided with an opening, an eccentric pin on the rock shaft working in said opening and adapted to engage the sides thereof to swing the toggle pin back and forth, there being a stationary abutment adjacent to the lower end of the toggle pin and immediately above the central portion of the balance lever, and a spring pressed ball in the lower end of the toggle pin adapted to travel over said abutment and into contact with the balance lever alternately at opposite sides of its pivotal point, substantially as described.

4. In a device of the class described the combination with a cylinder, a piston working therein, and a rock shaft in conjunction with said piston, and there being a suction passage adjacent to said cylinder, of valve mechanism for controlling communication between said suction passage and each end of the cylinder alternately, including a port reaching through the wall of the cylinder at each end thereof, a slide valve slidably mounted on the wall of the cylinder at each end thereof, the sliding face of each said valve being cut away to provide a recess therein, a balance lever pivotally mounted between the slide valves, an operative connection from each end of the balance lever to the adjacent slide valve, a toggle pin having its upper end pivotally mounted with respect to the cylinder and provided with an opening, an eccentric pin on the rock shaft working in said opening and adapted to engage the sides thereof to swing the toggle pin back and forth, there being an arcuate stationary abutment adjacent to the lower end of the toggle pin and immediately above the central portion of the balance lever, said abutment having its central portion higher than its end portions, and a spring pressed ball in the lower end of the toggle pin adapted to travel over said abutment and into contact with the balance lever alternately at opposite sides of its pivotal point, substantially as described.

5. In a device of the class described the combination with a cylinder, a piston working therein, and a rock shaft in conjunction with said piston, and there being a suction passage adjacent to said cylinder, a valve mechanism for controlling communication between said suction passage and each end of the cylinder alternately, including a port reaching through the wall of the cylinder at each end thereof, a slide valve slidably mounted on the wall of the cylinder adjacent to each said port, the sliding face of each said valve being cut away to provide a recess therein, a balance lever pivotally mounted between the slide valves, an operative connection from each end of the balance lever to the adjacent slide valve, a toggle pin having its upper end pivotally mounted with respect to the cylinder and having a pair of opposite abutments, an eccentric pin on the rock shaft adapted to engage said abutments in alternation as the rock shaft rocks, there being a convex arcuate stationary abutment adjacent to the lower end of the toggle pin and immediately above the central portion of the balance lever, and a spring pressed element carried by the lower end of the toggle pin adapted to travel over said abutment and into contact with the balance lever alternately at opposite sides of its pivotal point, substantially as described.

6. In a device of the class described the combination with a cylinder, a piston working therein, and a reciprocating element in conjunction with said piston, there being a suction passage adjacent to said cylinder, of valve mechanism for controlling communication between said suction passage and each end of the cylinder alternately, including a port reaching through the wall of the cylinder at each end thereof, a valve movably mounted with respect to the wall of the cylinder adjacent to each said port, a balance lever pivotally mounted between the valves, an operative connection from each end of the balance lever to the adjacent valve, a toggle pin having its upper end pivotally mounted with respect to the cylinder and having a pair of opposite abutments, said abutments being in position for engagement alternately by said reciprocating element, there being a convex arcuate stationary abutment adjacent to the lower end of the toggle pin and immediately above the central portion of the balance lever, and a spring pressed element carried by the lower end of the toggle pin adapted to travel over said abutment and into contact with the balance lever alternately at opposite sides of its pivotal point, substantially as described.

7. In a device of the class described the combination with a cylinder, a piston working therein, and a reciprocating element in conjunction with said piston, there being a suction passage adjacent to said cylinder, of valve mechanism for controlling communication between said suction passage and each end of the cylinder alternately, including a port reaching through the wall of the cylinder at each end thereof, a valve movably mounted with respect to the wall of the cylinder adjacent to each said port, a pivotally mounted balance lever, an operative connection from each end of the balance lever to the adjacent valve, a toggle pin having its upper end pivotally mounted with respect to the cylinder and having a pair of opposite abutments, said abutments being in position for engagement alternately by said reciprocating element, there being a convex arcuate stationary abutment adjacent to the lower end of the toggle pin and immediately above the central portion of the balance lever, and a spring pressed element carried by the lower end of the toggle pin adapted to travel over said abutment and into contact with the balance lever alternately at opposite sides of its pivotal point, substantially as described.

EDWARD J. HUDSON.